United States Patent
Solignat et al.

(10) Patent No.: US 7,395,905 B2
(45) Date of Patent: *Jul. 8, 2008

(54) ELECTROMECHANICAL ACTUATOR FOR A VEHICLE BRAKE, THE VEHICLE BRAKE INCLUDING SUCH AN ACTUATOR, AND A METHOD OF MAINTAINING SUCH AN ACTUATOR

(75) Inventors: Sylvain Solignat, Gentilly (FR); Patrick Baldassara, Pontcarre (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/998,638

(22) Filed: Nov. 30, 2004

(65) Prior Publication Data

US 2006/0090970 A1    May 4, 2006

(30) Foreign Application Priority Data

Oct. 28, 2004 (FR) .................................. 04 11509

(51) Int. Cl.
*B60L 7/00* (2006.01)
*F16D 55/36* (2006.01)

(52) U.S. Cl. .................. 188/162; 188/71.5; 188/73.32; 188/72.8

(58) Field of Classification Search ................. 188/156, 188/158, 73.32, 162, 72.1, 72.8, 71.5, 71.6, 188/18 A
See application file for complete search history.

(56) References Cited

U.S. PATENT DOCUMENTS 6,095,293 A * 8/2000 Brundrett et al. ........... 188/72.1
6,662,907 B1 * 12/2003 Brundrett et al. ........... 188/71.6

FOREIGN PATENT DOCUMENTS

| WO | WO 99/21266 | * | 4/1999 |
| WO | WO 99/60285 | * | 11/1999 |
| WO | WO 01/20188 A1 | | 3/2001 |
| WO | WO 01/36837 | * | 5/2001 |

* cited by examiner

*Primary Examiner*—Bradley T King
(74) *Attorney, Agent, or Firm*—Sughrue Mion, PLLC

(57) ABSTRACT

The invention provides an electromechanical actuator for a vehicle brake, the actuator comprising: a motor; a screw-and-nut system having a first element, the screw or the nut, rotated by the motor; and an antirotation member preventing rotation of the second element of the screw-and-nut system, the nut or the screw, so that the second element moves linearly in response rotation of the motor so as to exert compression selectively on friction elements of the brake. According to the invention, the actuator is subdivided into a first portion comprising the screw-and-nut system, and a second portion comprising the motor, the portions being designed to be separable while the actuator is mounted on a brake.

11 Claims, 2 Drawing Sheets

ELECTROMECHANICAL ACTUATOR FOR A VEHICLE BRAKE, THE VEHICLE BRAKE INCLUDING SUCH AN ACTUATOR, AND A METHOD OF MAINTAINING SUCH AN ACTUATOR

The invention relates to an electromechanical actuator for a vehicle brake, to a vehicle brake including such an actuator, and to a method of maintaining such an actuator.

BACKGROUND OF THE INVENTION

An airplane brake is known, in particular from U.S. Pat. No. 6,095,293, includes electromechanical actuators that can be removed individually. That document suggests replacing a faulty actuator by a working actuator directly on the airplane, without dismantling the brake.

Although such a method of maintenance may appear to be attractive, it can nevertheless raise a certain number of problems, including the difficulty of repositioning the actuator on the brake, particularly if the actuator is in a region of the brake that is difficult of access.

SUMMARY OF THE INVENTION

An object of the invention is to provide an actuator that does not present the drawbacks of the prior art.

BRIEF DESCRIPTION OF THE INVENTION

To this end, the invention provides an electromechanical actuator for a vehicle brake, the actuator comprising:
  a motor;
  a screw-and-nut system having a first element, the screw or the nut, rotated by the motor; and
  an antirotation member preventing rotation of the second element of the screw-and-nut system, the nut or the screw, so that the second element moves linearly in response rotation of the motor so as to exert compression selectively on friction elements of the brake;
  the actuator being, according to the invention, subdivided into a first portion comprising the screw-and-nut system, and a second portion comprising the motor, the portions being designed to be separable while the actuator is mounted on a brake.

The Applicant has found that the portion of the actuator that is most likely to fail is the portion that includes the electric motor. Subdividing the actuator in accordance with the invention makes it possible to replace only the second portion in the event of a failure of the motor alone, thus avoiding any need to dismantle the first portion which remains in place on the brake, thereby eliminating problems of repositioning the brake actuation facing the friction elements (and in this case at least the screw-and-nut system).

The invention also provides a vehicle brake comprising friction elements and a support extending facing the friction elements to carry at least one actuator of the invention, the brake being arranged in such a manner that the second portion of the actuator can be separated from the first portion of the actuator while the first portion remains carried by the support.

Preferably, the brake support is arranged to make it impossible to dismantle the first portion of the actuator from the support unless the second portion of the actuator has been separated from the first portion of the actuator.

In a particular aspect of the invention, the support is arranged to receive the first portion of the actuator along a first assembly path and to receive the second portion of the actuator along a second assembly path that is distinct from the first assembly path.

In which case, it is preferable for the first assembly path to extend in a plane perpendicular to a longitudinal axis of the brake, and for the second assembly path to extend along a direction that is parallel to said longitudinal axis of the brake.

Finally, the invention also provides a method of maintaining the brake of the invention, the method comprising the steps of:
  identifying failure of an actuator;
  verifying whether the failure originates in the first portion or the second portion; and
  if the failure comes solely from the second portion of the actuator, replacing solely the second portion of the actuator.

BRIEF DESCRIPTION OF THE DRAWINGS

The invention will be better understood in the light of the following description given with reference to the Figures of the accompanying drawings, in which.

DETAILED DESCRIPTION OF THE INVENTION

Figure 1:
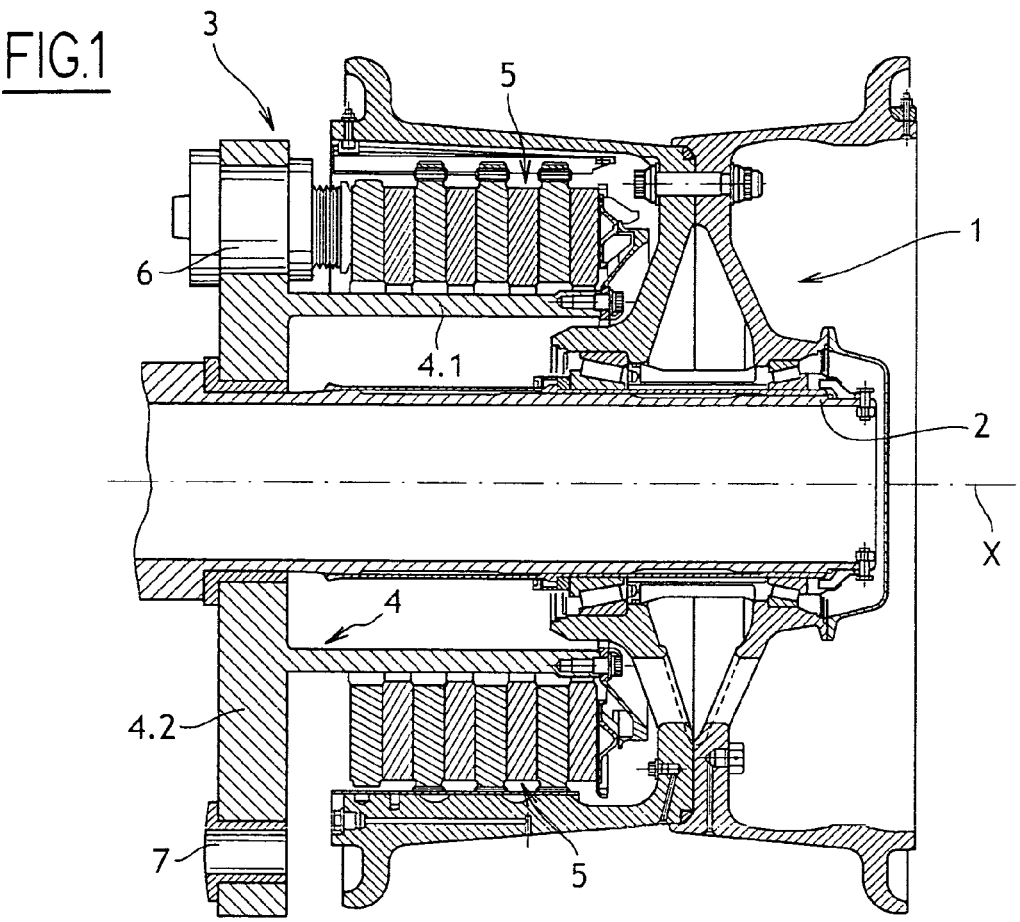
FIG. 1 is a diagrammatic section view on line I-I of FIG. 3 showing a wheel fitted with a brake having electromechanical actuators of the invention.
Figure 2:
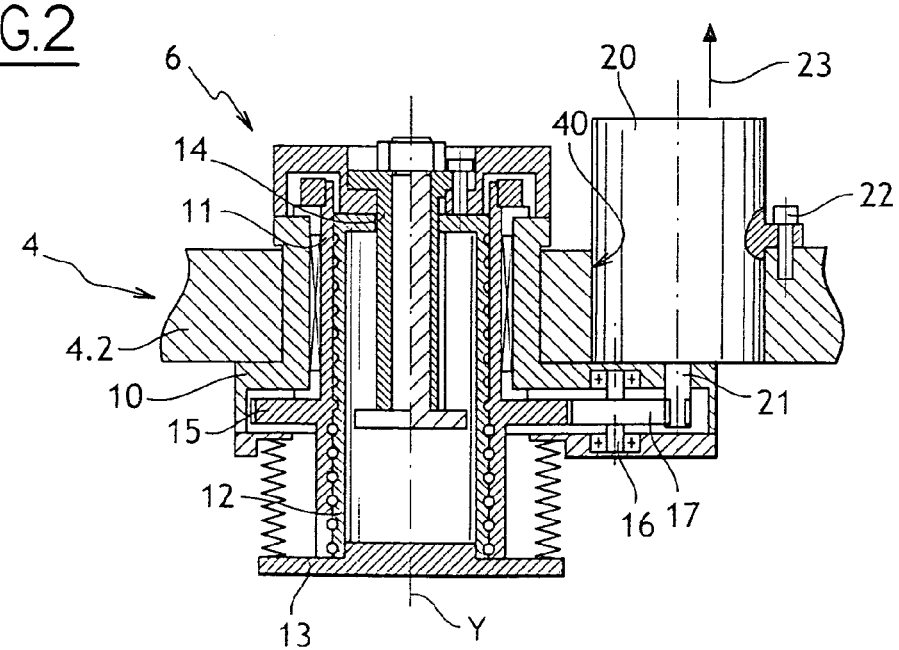
FIG. 2 is a fragmentary section on a larger scale showing one of the actuators fitted to the brake of FIG. 1.

FIG. 1 shows an airplane wheel 1 mounted to rotate on an axle 2 about a longitudinal axis X. The wheel 1 is associated with a brake 3 extending generally along the axis X, comprising a stack of disks (constituted by stator disks alternating with rotor disks), and a support 4 fitted on the axle 2 and carrying a certain number of electromechanical actuators 6.

The support 4 has a tubular portion 4.1 co-operating with some of the disks in the stack of disks 5, and a plate 4.2 receiving the actuators 6.

The plate 4.2 has a bore 7 receiving a stop (not shown) for preventing the support 4 of the brake 3 from rotating.

Figure 3:
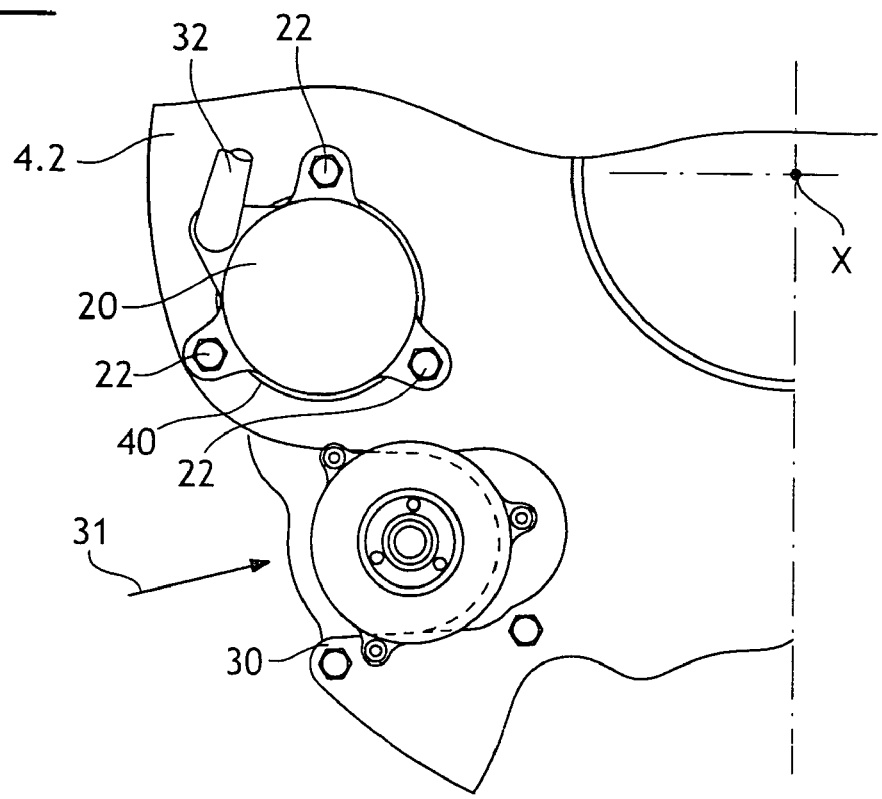
FIG. 3 is an enlarged front view showing the brake support of FIG. 1.

As can be seen in FIG. 3, each actuator 6 comprises a first portion 10 which receives a nut 11 rotatable about an axis Y. The nut 11 co-operates with a screw 12 terminated by a shoe 13. An antirotation member 14 that is externally fluted extends along the axis Y to co-operate with the screw 12 to prevent it from turning. The nut includes a toothed wheel 15 which, via a certain number of gearing stages 16, is connected in rotation with an inlet gearwheel 17.

The actuator 6 has a second portion 20 fitted to the plate 4.2. The second portion 20 houses an electric motor 21 and its shaft 21 can be seen projecting therefrom. When the second portion 20 is in place on the support 4, the shaft of the electric motor 21 penetrates into the first portion 10 to co-operate with the inlet gearwheel 17 and enables the nut 11 to be driven by the electric motor 21, thereby enabling the screw 12 to be moved facing the stack of disks 5.

The actuators 6 thus enable a compression force to be applied to the stack of disks 5 via the shoe 13 which generates friction for slowing down rotation of the wheel 1.

The two portions are thus very easily separable, constituting two line replaceable units (LRUs) that can be replaced independently of each other.

With reference to FIG. 3, the plate 4.2 of the support 4 defines forks 30 (only one visible in this figure) having openings directed in directions that are perpendicular to the axis X, as represented by arrows 31.

Each fork 30 receives the first portion 10 of an actuator 6, such that the axis Y along which the screw-and-nut system 11, 12 of the actuator extends is parallel to the longitudinal axis X of the brake (seen end-on in this figure). In an orifice 40 of the plate 4.2 formed beside each fork 30, there extends the associated second portion 20 of the actuator 6.

A power supply cable 32 extends from the second portion 20 to a power supply plate (not shown) of the support 4.

In order to dismantle the second portion 20 of an actuator 6, it suffices to remove the three screws 22 securing the second portion 20 to the plate 4.2, and to disengage the second portion 20 along a direction parallel to the axis X.

The second portion 20 is removable from the plate 4.2 without any need to separate the first portion 10 from the plate 4.2 for that purpose.

This aspect of the invention is particularly useful when taking action after detecting a failure of one of the actuators. If the motor is the faulty member of the actuator, then it suffices to replace only the second portion 20, without touching the first portion 30 of the actuator concerned.

This avoids pointless disassembly of the first portion 10 containing the screw-and-nut system, where poor repositioning of this portion can be particularly harmful for operation of the brake.

Once the second portion 20 has been removed, the first portion 10 can be removed from the plate 4.2 in the direction 31, should that be necessary.

The two portions are thus very easily separable, thereby constituting two line replaceable units (LRUs) that can be replaced independently of each other.

It should be observed that it is not possible to install or remove the first portion 10 of an actuator 6 on or from the plate 4.2 unless the second portion 20 has already been separated from the plate 4.2.

Thus, in order to disassemble the actuator, the second portion 20 of the actuator is initially separated from the plate 4.2 by being moved away therefrom in a direction parallel to the axis X, after which the first portion is withdrawn from the support by moving it away along a direction 31 perpendicular to the axis X.

In order to mount an actuator on the brake, the first portion 10 of an actuator is fitted to the plate 4.2 by being moved in a direction 31 perpendicular to the axis X, after which the second portion 20 is fitted to the plate 4.2 in a direction parallel to the axis X.

Figure 4:
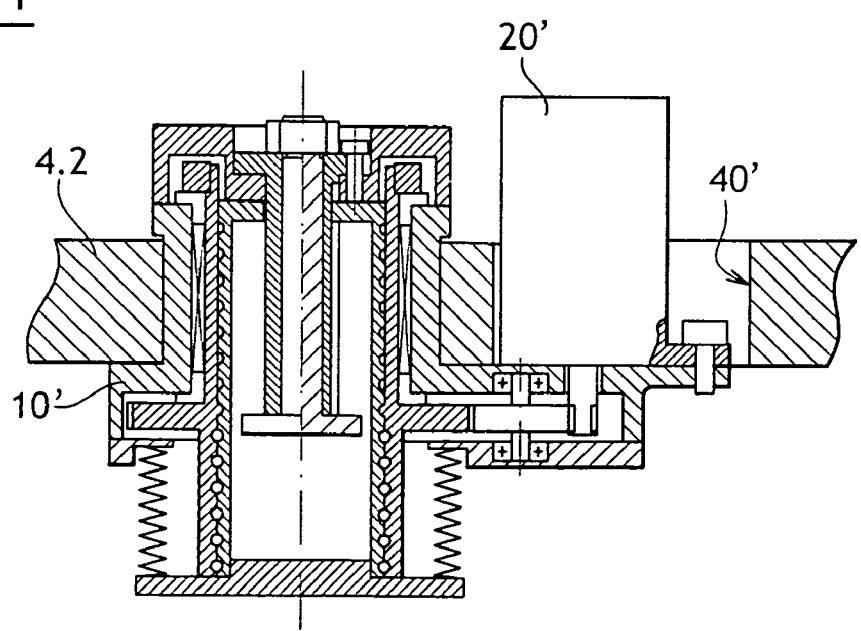
FIG. 4 is a view analogous to FIG. 2 showing a variant embodiment of the actuator of the invention.

In a variant shown in FIG. 4, the actuator of the invention could be designed in such a manner that the second portion 20' is fitted directly to the first portion 10' and not to the plate 4.2. As before, the first portion 10' cannot be disassembled from the support 4.2 unless the second portion 20' has previously-been removed.

The invention is not limited to the description above, but on the contrary covers any variant coming within the ambit defined by the claims.

In particular, although it is stated above that the first portion of the actuator is separable from the brake support, the first portion could be integrated in the brake support in such a manner as not to be separable in service.

Although it is stated that the assembly path of the first portion is perpendicular to the axis X of the brake, while the assembly path of the second portion is parallel to the axis X, the assembly paths can be arbitrary.

Although in the examples shown, it is the nut of the actuator that is rotated by the motor, it is equally possible to provide for the motor to drive the screw in rotation.

Although in the examples shown, the first portion of the actuator cannot be separated from the support without previously removing the second portion of the actuator, the brake actuator of the invention need not present this characteristic, thereby enabling the first portion to be removed while the second portion remains secured to the support, or indeed thereby enabling the actuator to be removed as a unit, with the two portions nevertheless remaining mutually separable while the actuator is mounted on the brake.

What is claimed is:

1. A vehicle brake comprising:
   friction elements;
   a support member extending facing the friction elements for supporting at least one actuator;
   said at least one actuator being subdivided into:
      a first portion comprising a screw-and-nut system having one of a screw and a nut forming a first element and the other forming a second element of the screw-and-nut system, said first element being rotatable while said second element cooperates with an antirotation device so that rotation of the first element causes the second element to move linearly to selectively exert compression on the friction elements, said screw-and-nut system having a main axis defining a first axis of said first portion;
      a second portion including a motor, said motor having a rotation axis defining a second axis of said second portion;
   said first portion being fitted on the support member and being removable as a whole from said brake, said second portion also being removable as a whole from said brake;
   said first portion and second portion operationally cooperating to transmit a rotary motion of the motor to said first element of the screw-and-nut system so that rotation of the motor causes linear motion of the second element of said screw-and-nut system, said first axis and said second axis being non-coaxial when said first portion and said second portion cooperate;
   wherein the support member is arranged so that:
      said second portion can be removed from the brake while said first portion
      remains in place on said support; and
   said first portion can be removed from the brake only when said second portion has been previously removed;
   wherein said first portion of the actuator is removable from the brake along a first assembly path, and said second portion of the actuator is removable from the brake along a second assembly path that is distinct from said first assembly path;
   wherein said first assembly path extends in a plane perpendicular to a longitudinal axis of said brake, and the second assembly path extends in a direction parallel to said longitudinal axis of said brake; and
   wherein said support member defines a fork between which said first portion is engaged following said first assembly path, said support member defining a hole into which said second portion is engaged following said second assembly path, said second portion having an output shaft projecting therefrom and penetrating into said first portion.

2. A brake according to claim 1, wherein said actuator includes a gearing stage for transmitting a rotary motion of said motor to said first element of the screw-and-nut system, said gearing stage being included into said first portion of said actuator.

3. The brake according to claim 1, wherein the support member is arranged so that the second portion is attached to the support member and can be removed from the support member while the first portion remains in place on the support.

4. The brake according to claim 1, wherein the support member is arranged so that the second portion is attached to the first portion and can be removed from the first portion while the first portion remains in place on the support.

5. A vehicle brake comprising:
   friction elements;
   at least one actuator;
   a support member that supports the at least one actuator, wherein the at least one actuator is subdivided into:
   a first portion comprising a screw-and-nut system comprising one of a screw and a nut forming a first element and the other forming a second element of the screw-and-nut system, the first element rotatable while the second element cooperates with an antirotation device so that rotation of the first element causes the second element to move linearly to exert compression on the friction elements, the screw-and-nut system comprising a first axis of the first portion along which the second element moves linearly; and
   a second portion comprising a motor, the motor comprising a drive shaft that rotates about an axis defining a second axis of the second portion;
   wherein the first portion is fitted on the support member and is removable as a whole from the brake, and the second portion is separately removable as a whole from the brake;
   wherein the first portion and the second portion operationally cooperate to transmit a rotary motion of the motor to the first element of the screw-and-nut system so that rotation of the motor causes linear motion of the second element of the screw-and-nut system;
   wherein the first axis and the second axis are not coaxial when the first portion and the second portion operationally cooperate; and
   wherein the support member is arranged so that the second portion is removable from the brake while the first portion remains in place on the support member, and the first portion is removable from the support member only when the second portion has been previously removed; and
   wherein the first portion is positioned within a fork of the support member by sliding the first portion in a generally inward radial direction of the support member.

6. The brake according to claim 5, wherein the first axis and the second axis are parallel when the first portion and the second portion operationally cooperate.

7. The brake according to claim 5, wherein the first portion and the second portion are circumferentially spaced about the support member.

8. The brake according to claim 5, wherein the second portion is positioned within a hole of the support member that is offset from the fork.

9. The brake according to claim 5, wherein the support member has a center axis and the first portion extends in a direction traverse to the center axis on one side of the support so as to operationally engage the second portion.

10. The brake according to claim 5 wherein the support member is arranged so that the second portion is attached to the support member and removable from the support member while the first portion remains in place on the support member.

11. The brake according to claim 5, wherein the support member is arranged so that the second portion is attached to the first portion and removable from the first portion while the first portion remains in place on the support member.

* * * * *